(12) United States Patent
Kunz

(10) Patent No.: US 12,236,294 B2
(45) Date of Patent: Feb. 25, 2025

(54) CONCURRENT OUTBOX TABLE FOR RELIABLE MESSAGING

(71) Applicant: SAP SE, Walldorf (DE)

(72) Inventor: David Kunz, Wilhelmsfeld (DE)

(73) Assignee: SAP SE, Walldorf (DE)

( * ) Notice: Subject to any disclaimer, the term of this patent is extended or adjusted under 35 U.S.C. 154(b) by 41 days.

(21) Appl. No.: 18/073,678

(22) Filed: Dec. 2, 2022

(65) Prior Publication Data
US 2024/0184652 A1    Jun. 6, 2024

(51) Int. Cl.
*G06F 16/27*        (2019.01)
*G06F 9/54*         (2006.01)

(52) U.S. Cl.
CPC ............ *G06F 9/547* (2013.01); *G06F 16/278* (2019.01)

(58) Field of Classification Search
None
See application file for complete search history.

(56) References Cited

U.S. PATENT DOCUMENTS

| | | | | |
|---|---|---|---|---|
| 6,772,155 | B1 * | 8/2004 | Stegelmann | G06F 16/2343 |
| 2019/0098106 | A1 * | 3/2019 | Mungel | H04L 67/564 |
| 2020/0344109 | A1 * | 10/2020 | Shil | H04L 41/0846 |
| 2021/0133015 | A1 * | 5/2021 | Agarwal | G06F 11/36 |
| 2021/0165763 | A1 * | 6/2021 | Banerjee | G06F 16/90335 |
| 2021/0173759 | A1 * | 6/2021 | Rupp | G06F 11/302 |
| 2022/0405184 | A1 * | 12/2022 | Liu | G06F 11/327 |
| 2024/0048476 | A1 * | 2/2024 | Adeel | H04L 45/02 |

FOREIGN PATENT DOCUMENTS

| | | | | |
|---|---|---|---|---|
| CN | 113535668 | A | * 10/2021 | |
| CN | 114138510 | A | * 3/2022 | G06F 16/1815 |
| CN | 115391827 | A | * 11/2022 | |

OTHER PUBLICATIONS

Towards concurrent audit logging in microservices, 2021 IEEE 45th Annual Computers, Software, and Applications Conference (COMPSAC), Amir-Mohammadian et al.(Year: 2021).*

* cited by examiner

*Primary Examiner* — Augustine K. Obisesan
(74) *Attorney, Agent, or Firm* — SCHWEGMAN LUNDBERG & WOESSNER, P.A.

(57) ABSTRACT

In an example embodiment, a solution is provided in which an outbox table is added to each container in a database. Rather than perform an emit solely using the application instance alone (in response to a notification from the database that the underlying database action has been performed), or using an outside outbox table processor, an outbox table processor is integrated into the microservice application. When a database action is performed by the microservice application, that database action is written into the outbox table in the corresponding container in the database. Furthermore, whenever the outbox table processor determines that the state of the database has changed in a way that leads to an emit, it then reads the actions in the outbox table, issues an emit to notify one or more external systems of the actions, and deletes those actions from the outbox table.

20 Claims, 6 Drawing Sheets

CONCURRENT OUTBOX TABLE FOR RELIABLE MESSAGING

TECHNICAL FIELD

This document generally relates to microservice software environments. More specifically, this document relates to use of a concurrent outbox table for reliable messaging in a microservice software environment.

BACKGROUND

Microservices are small, independent software processes that can be written in multiple languages. An infrastructure designed for these modular components is known as a microservices environment or microservices architecture. Cloud environments may be used to implement microservices environments. An example of a microservices environment is SAP Business Technology Platform (BTP), from SAP SE of Walldorf, Germany.

Some microservices receive requests or commands from a user (such as via a user interface), and in response perform some sort of action on a database. For example, a user may request that a new customer be added to a database, and the microservice then takes this request and formulates a database command to add the new customer to a customer table of the database. The results of actions on the database can then be reported to one or more external systems, such as by using a message broker to notify the external systems of the actions.

BRIEF DESCRIPTION OF DRAWINGS

The present disclosure is illustrated by way of example and not limitation in the figures of the accompanying drawings, in which like references indicate similar elements.

DETAILED DESCRIPTION

Figure 1:
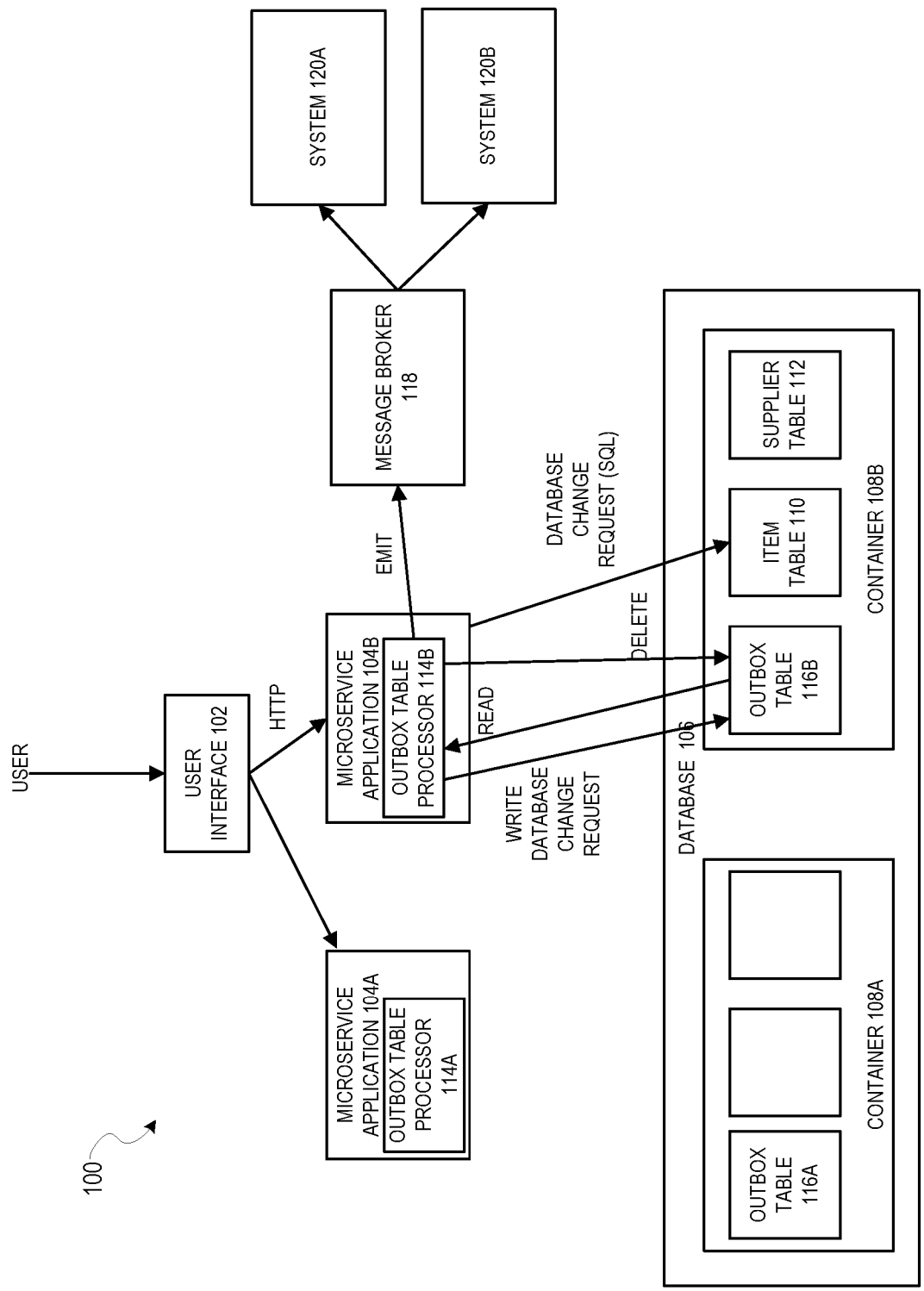
FIG. 1 is a block diagram illustrating a system in accordance with an example embodiment.

The description that follows discusses illustrative systems, methods, techniques, instruction sequences, and computing machine program products. In the following description, for purposes of explanation, numerous specific details are set forth in order to provide an understanding of various example embodiments of the present subject matter. It will be evident, however, to those skilled in the art, that various example embodiments of the present subject matter may be practiced without these specific details.

In modern cloud architecture, different microservices communicate with each other through either synchronous or asynchronous (or both) communication. Technical issues can arise, however, when such communications are used to report actions taken on databases by microservices. For example, a microservice may attempt to alter a database table in response to a user request and then transmit a notification (called an "emit") of the alteration to one or more other users in external systems, but it is possible that the database transaction may fail or that the emit may fail (either due to the external system being down or the network between the microservice and the external system being down). While it may be possible for the microservice to attempt to retry the emit if the emit has failed and/or wait to try to emit until the database transaction has succeeded, neither of these solutions work if the microservices application itself crashes, which then means that the microservices application has no record of the fact that it needs to report the action on the database, and the other users never get notified of the action.

These technical issues are further complicated by the fact that in modern cloud architecture, it is common for databases to be shared by multiple customers ("multitenant databases") with communications to and from the database not shared by the customers, and each customer having a dedicated space (container) in the database in which actions for that customer are performed. Furthermore, in modern cloud architecture it is also common for multiple instances of an application to be running simultaneously on a server, to provide load balancing.

In an example embodiment, a solution is provided in which an outbox table is added to each container in a database. Rather than perform an emit solely using the application instance alone (in response to a notification from the database that the underlying database action has been performed), or using an outside outbox table processor, an outbox table processor is integrated into the microservice application. When a database action is performed by the microservice application, that database action is written into the outbox table in the corresponding container in the database. Furthermore, whenever the outbox table processor determines that the state of the database has changed in a way that leads to an emit, it then reads the actions in the outbox table, issues an emit to notify one or more external systems of the actions, and deletes those actions from the outbox table. This determination may be based on two criteria: (1) the outbox processor has sent a database statement for processing; and (1) the database statement changes the state of the database in a way that the change leads to an emit. While this emit will often include the database action that the microservice application just performed on the database, it can also include prior database actions that the microservice application performed on the database but that were not part of a prior emit, possibly due to a failure of some type.

It should be noted that the benefits of the solution may be most experienced in systems where the notifications generated to end-point external systems (such as devices of other end-users) are asynchronous, such as those generated by a message broker. Nevertheless, the solution can also have benefits in systems where such notifications are synchronous, but where the sender does not really care about receiving confirmation that the notifications were successful.

Additional optimizations can be performed to increase efficiency of the solution in various types of environments. One such optimization is the use of a select-for update statement when the outbox table processor reads actions from the outbox table. A select-for update statement is used when updating a database table to ensure that the selected rows are locked during the transaction. In this case, it is not necessary that the database table actually be updated, as the outbox table processor may just be reading the actions from the outbox table, but the select-for update statement is still used in lieu of a read statement to ensure that the table is locked during this reading process. This allows identified portions of the outbox table to be locked during the reading and emitting process in case another outbox table processor attempts to read from the same outbox table during that time. This can occur, for example, in cloud environments where there are multiple instances of the microservice application running simultaneously or for load balancing purposes, or alternatively can happen for only one instance if multiple emits are triggered in a short time frame (leading to multiple processing runs). The same customer may issue requests that cause database changes in a short time frame, with one of the requests being routed to one microservice application instance and another of the requests being routed to another microservice application instance.

In another example embodiment, multiple microservice applications are utilized, where each microservice application has its own outbox table processor that can be connected to the same database and/or database container.

The effect of locking is that the entries in the outbox table are not able to be read by other outbox processors. In some example embodiments, other outbox processors are able to add new entries to the outbox table, without affecting the locked entries in the outbox table.

An additional variation of this optimization occurs because the select-for command can be expensive, both computationally and with respect to network bandwidth. Thus, in cases where the microservice application instance is aware of an outstanding select-for update statement for a particular outbox table (such as due to the fact that the microservice application instance recently sent such a select-for update statement), rather than reflexively sending another select-for update statement for the same outbox table if another customer request comes in for a change to the same database, it will hold the subsequent select-for update until it knows that the operations relating to the prior select-for update (reading, emitting, and deleting) have been completed. This essentially acts like a state machine with states "no select-for update is in process" and "select-for update is in process."

Another optimization that can be performed is to order the entries in the outbox table temporally, such as by ordering by timestamp of when each entry was added to the outbox table. This allows the ordering of entries to be preserved when they are read out by the outbox table processor.

Another optimization that can be performed is for the outbox message processor to send a plurality of notifications as a chunk rather than one at a time. More specifically, when, for example, the outbox table processor reads 10 entries out of the outbox table, rather than issuing an emit for each one of the 10, it can issue a single emit (say, for one of them), and determine whether the emit was successful (such as if the receiving external system has returned an indication that the emit was successfully received). Only once it is sure that the first emit has been received, will it then send a chunk emit with the remaining nine. This significantly reduces the possibility of sending large quantities of emits that are unsuccessfully due to, for example, a network issue or an external system issue.

Another optimization that can be performed is to have a field in the outbox table that tracks, for each entry, the number of times an outbox table processor attempts to read out the entry and send an emit based on the entry. This field may essentially be a counter for each entry that is increased with each read of the entry from an outbox table processor. The outbox table processor can then, when performing a read, only do so if the number of previous attempts (as tracked by the field) does not exceed some predetermined maximum number of attempts. Additionally, a field can be stored for the last known error, such as if a prior attempt fails due to a network error, an indication of a network error (as well as a time stamp of the error) can be stored. This can be useful in cases where it is desirable to wait to retry a failed attempt based on some mathematical formula that relies on knowing when the last error actually occurred (for example, increasing the delay for the next retry exponentially with each failed attempt).

In some example embodiments, the entire outbox table is read out when the outbox table processor attempts to read out entries from the outbox table. In other example embodiments, however, there is some criterion that is used to limit the entries read out. For example, it may only read out entries that correspond to particular types of database transactions, or which were requested by particular users, or that were added in a particular time period, etc.

In some example embodiments, the system comprises multiple outbox data structures, wherein during launch or restart of an outbox processor, the outbox processor reads out the multiple outbox data structures, in particular all outbox data structures of the system. This addresses the possibility that the outbox processor or microservice application crashes without all messages having been emitted.

FIG. 1 is a block diagram illustrating a system 100 in accordance with an example embodiment. A user communicates with a user interface 102, which generates one or more action requests to one or more microservice applications 104A, 104B. The user interface 102 may be, for example, a dedicated client application running on a device of the user, or may be a web page running in a browser on the device of the user. Each of these action requests may request some sort of action (e.g., create, update, delete) involving one or more database data structures (such as database tables). In some example embodiments, these action requests may be communicated via HyperText Transfer Protocol (HTTP).

Each microservice application 104A, 104B then takes these action requests and generates one or more database statements (such as SQL statements) to a database 106 to perform the corresponding actions. In an example embodiment, the database 106 is a multitenant database, with a different container 108A, 108B for each customer. Each container 108A, 108B maintains data structures (such as tables) of the database 106 that are accessible by the corresponding customer. Here, for example, container 108B is depicted with an item table 110 and a supplier table 112. These are merely examples, and any number of different types of tables (or other data structures) may be maintained in each container 108A, 108B.

As used herein, a "database" is a data storage resource and may store data structured as a text file, a table, a spreadsheet, a relational database (e.g., an object-relational database), a triple store, a hierarchical data store, a document-oriented NoSQL database, a file store, or any suitable combination thereof. The database may be an in-memory database.

An in-memory database (also known as an in-memory database management system) is a type of database management system that primarily relies on main memory for computer data storage. It is contrasted with database management systems that employ a disk storage mechanism. In-memory databases are traditionally faster than disk storage databases because disk access is slower than memory access. One example in-memory database is the HANA® database from SAP SE, of Walldorf, Germany. Thus, in embodiments where the HANA® database is used with the microservices, each HANA® instance may contain a plurality of different containers, called HANA® Deployment Infrastructure (HDI) containers.

In an example embodiment, each microservice application 104A, 104B additionally contains an outbox table processor 114A, 114B. The outbox table processor 114A, 114B acts to write to and read from an outbox table (or similar data structure) 116A, 116B on a corresponding container 108A, 108B. Here, for example, if the user operating the user interface 102 is a customer corresponding to container 108B, then the outbox table processor 114B of microservice application 104B acts to write to and read from outbox table 116B.

As mentioned earlier, when a database action is performed by the microservice application 104B, it generates a SQL or similar database statement to perform an action on one or more of the data structures in the corresponding container (here, that would be item table 110 and/or supplier table 112 of container 108B). Additionally, when this database statement is sent to the container 108B, another database statement is generated by the microservice application 104B and sent to the container 108B to write an entry corresponding to the database change in the outbox table 116B. This entry may include, for example, an indication of what database change is being attempted, and a timestamp of the attempt. In some example embodiments this entry may further include an indication of a number of attempts made to read out the entry and the timestamp of the last attempt.

Furthermore, whenever the outbox table processor 114B determines that the state of the database has changed in a way that leads to an emit, it then reads the entries in the outbox table 116B and generates an emit to notify one or more external systems of the actions, and then also deletes the corresponding entries from the outbox table 116B. In an example embodiment, the outbox table processor 114B knows the state of the database has changed in a way that leads to an emit, because microservice application 104B is the component that made the change. This determination may be based on two criteria: (1) the outbox processor has sent a database statement for processing; and (1) the database statement changes the state of the database in a way that the change leads to an emit. In other example embodiments, other mechanisms for detecting the change in state may be used. While the emit will often include a notification of the database action that the microservice application 104B just performed on the database container 108B, it can also include prior database actions that the microservice application 104B performed on the database container 108B but that were not part of a prior emit, possibly due to a failure of some type.

Here, these notifications are sent to message broker 118, which itself is an external system that generates and sends asynchronous communications to additional external systems 120A, 120B. A message broker is software that enables applications, systems, and services to communicate with each other and exchange information. Message brokers can be used for asynchronous communication using a publish/subscribe model. In this message distribution pattern, the source of each message publishes the message to a topic at the message broker, and multiple message consumers subscribe to topics from which they want to receive messages. All messages published to a topic are distributed to all the applications subscribed to it.

Figure 2:
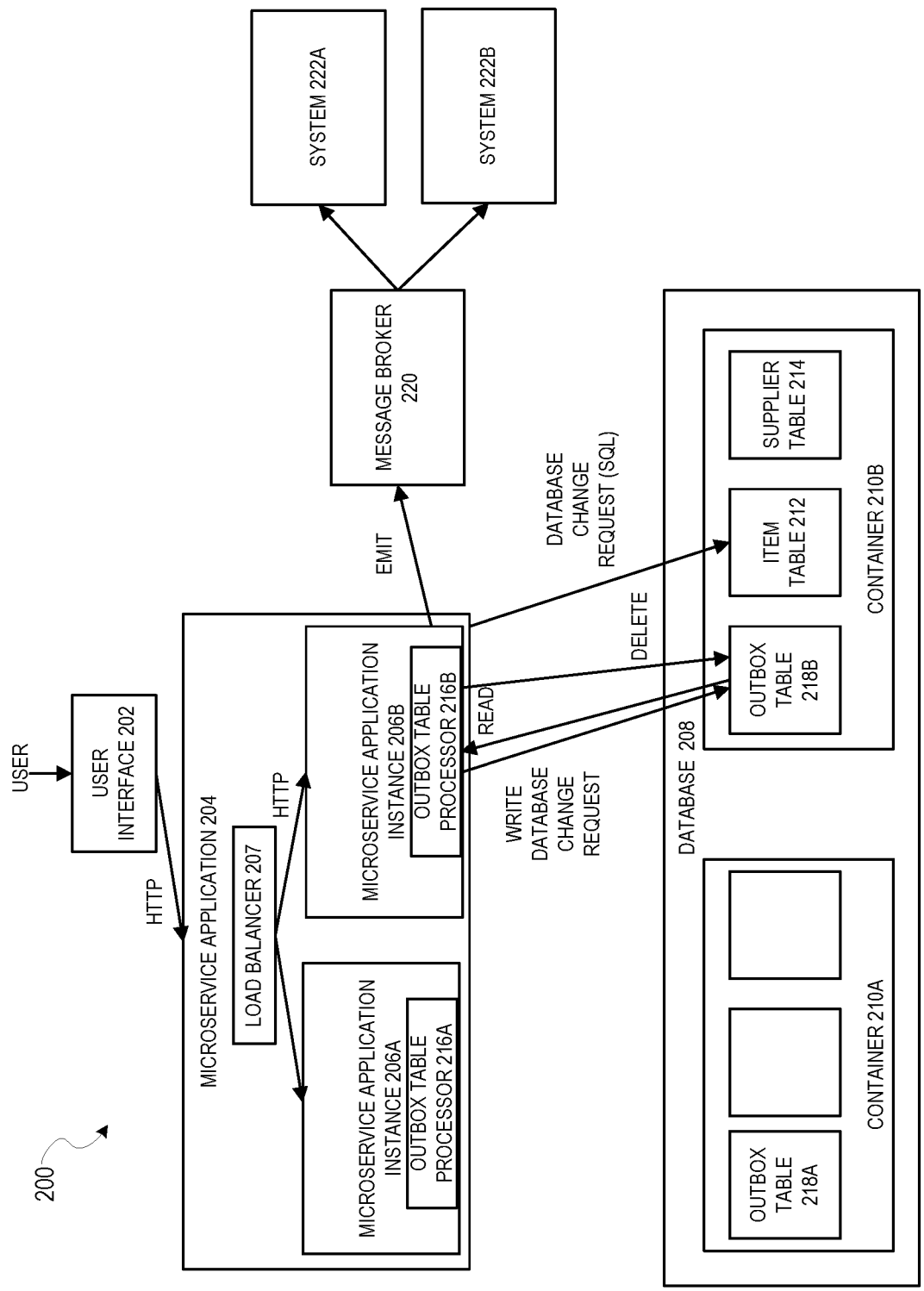
FIG. 2 is a block diagram illustrating a system in accordance with another example embodiment.

FIG. 2 is a block diagram illustrating a system 200, in accordance with another example embodiment. A user communicates with a user interface 202, which generates one or more action requests to microservice application 204. The microservice application 204 here may be a cloud application that may maintain a plurality of different microservice application instances 206A, 206B, each running a full version of the microservice application 204, but potentially located on a different physical server. A load balancer 207 then may route incoming requests from the user interface 202 to whichever microservice application instance 206A, 206B it determines would process it best (such as which is the least busy).

Each microservice application instance 206A, 206B then takes these action requests and generates one or more database statements (such as SQL statements) to a database 208 to perform the corresponding actions. In an example embodiment, the database 208 is a multitenant database, with a different container 210A, 210B for each customer. Each container 210A, 210B maintains data structures (such as tables) of the database 208 that are accessible by the corresponding customer. Here, for example, container 210B is depicted with an item table 212 and a supplier table 214.

In an example embodiment, each microservice application instance 206A, 206B additionally contains an outbox table processor 216A, 216B. The outbox table processor 216A, 216B acts to write to and read from an outbox table (or similar data structure) 218A, 218B on a corresponding container 210A, 210B. Here, for example, if the user operating the user interface 202 is a customer corresponding to container 210B, then the outbox table processor 216B of microservice application instance 206B acts to write to and read from outbox table 218B.

As mentioned earlier, when a database action is performed by the microservice application instance 206B, it generates a SQL or similar database statement to perform an action on one or more of the data structures in the corresponding container (here, that would be item table 212 and/or supplier table 214 of container 210B). Additionally, when this database statement is sent to the container 210B, another database statement is generated by the microservice application instance 206B and sent to the container 210B to write an entry corresponding to the database change in the outbox table 218B. This entry may include, for example, an indication of what database change is being attempted, and a timestamp of the attempt. In some example embodiments this entry may further include an indication of a number of attempts made to read out the entry and the timestamp of the last attempt.

Furthermore, whenever the outbox table processor 216B determines that the state of the database has changed in a way that leads to an emit, in the container 210B has changed, it then reads the entries in the outbox table 218B and generates an emit to notify on one or more external systems of the actions, and then also deletes the corresponding entries from the outbox table 218B. In an example embodiment, the outbox table processor 216B knows the state of the database has changed in a way that leads to an emit, because microservice application instance 206B is the component that made the change. In other example embodiments, other mechanisms for detecting the change in state may be used. While the emit will often include a notification of the database action that the microservice application instance 206B just performed on the database container 210B, it can also include prior database actions that the microservice application instance 206B performed on the database container 210B but that were not part of a prior emit, possibly due to a failure of some type.

Here, these notifications are sent to message broker 220, which itself is an external system that generates and sends asynchronous communications to additional external systems 222A, 222B, such as by using a publish/subscribe model.

Figure 3:
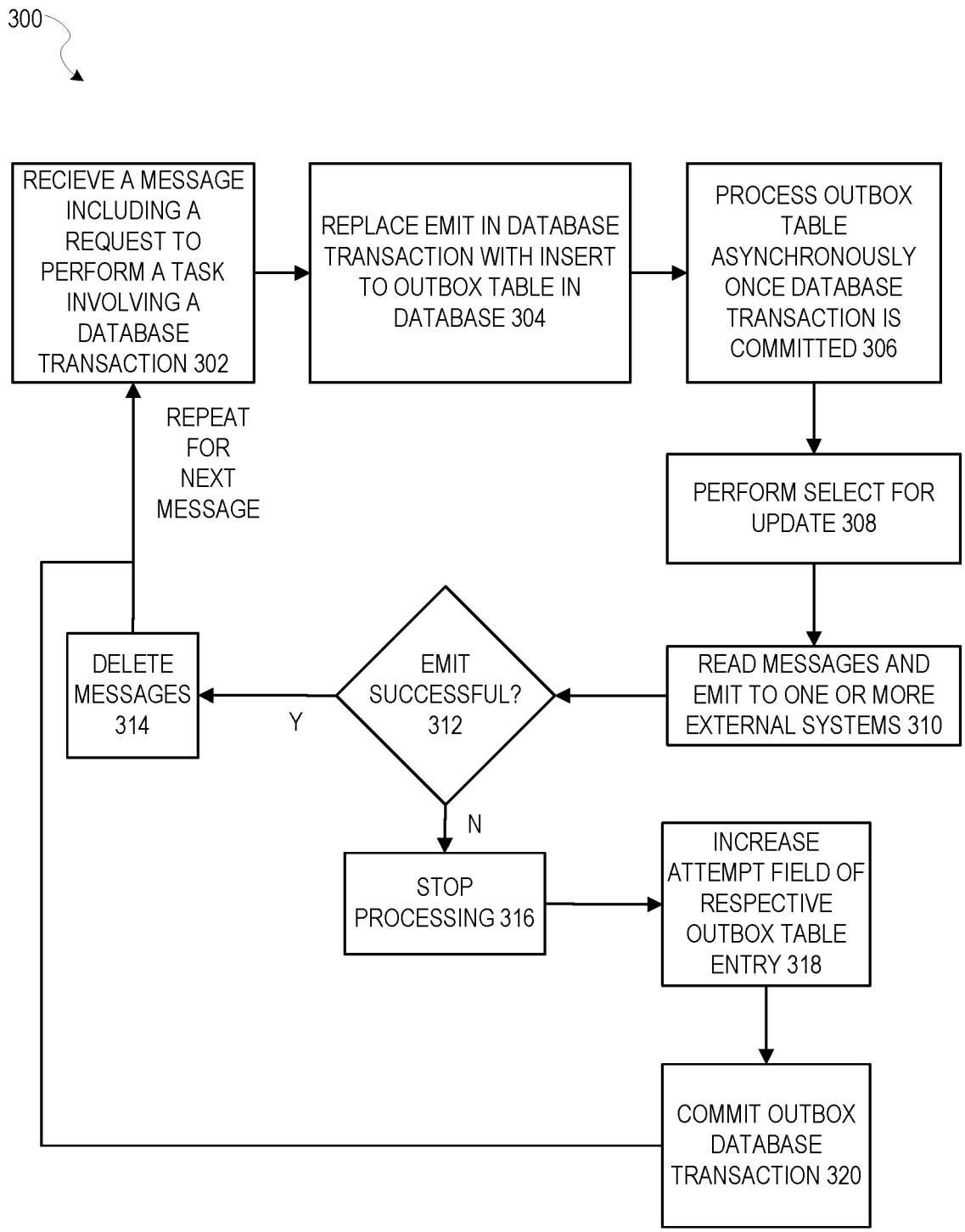
FIG. 3 is a flow diagram illustrating a method in accordance with an example embodiment.

FIG. 3 is a flow diagram illustrating a method 300 in accordance with an example embodiment. This method 300 may be performed by, for example, an outbox processor contained within an instance of a microservice application. At operation 302, a message is received. The message includes a request to perform a task involving a database transaction. The request need not be explicitly requesting the database transaction. Rather, the request can be requesting that the microservice application performs some task that the microservice application determines requires a database transaction to complete. This database transaction may include an emit, which is a command to send a notification of results of the database transaction to one or more external systems.

At operation 304, the emit in the database transaction is replaced with an insert command to an outbox table in the database. In an example embodiment, the outbox table is contained in a container of the database. At operation 306, once it is determined that the database transaction is committed, the outbox table is processed asynchronously. This means that at operation 308, a select-for update is performed on the outbox table, which locks the outbox table. Then at operation 310, messages are read out of the outbox table and emitted to the one or more external systems.

At operation 312, it is determined if the emit was successful. If so, then at operation 314 the read out messages are deleted from the outbox table. The method 300 can then repeat to operation 302 for processing another incoming message.

If at operation 312 it is determined that the emit was not successful, then at operation 316, processing of the emit is stopped. Then at operation 318, an attempt field of the respective outbox table entry (or entries) is increased. Then at operation 320, the outbox database transaction is committed. The method 300 can then repeat to operation 302 for processing another incoming message.

Figure 4:
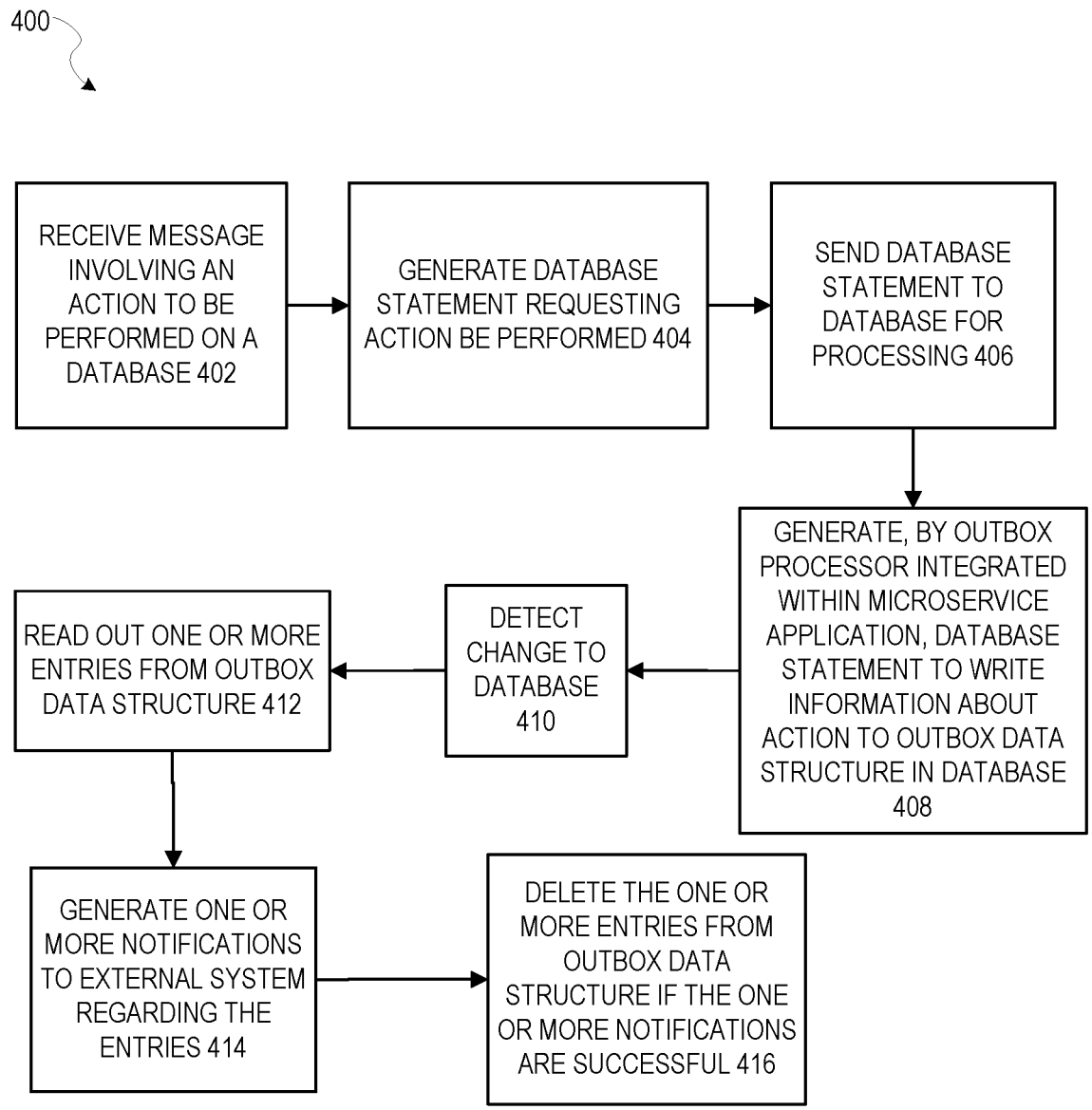
FIG. 4 is a flow diagram illustrating a method in accordance with another example embodiment.

FIG. 4 is a flow diagram illustrating a method 400 in accordance with another example embodiment. At operation 402, a message is received at a microservice application, the message involving an action to be performed on a database. At operation 404, a database statement is generated requesting the action be performed. At operation 406, the database statement is sent to a database for processing. In an example embodiment, the database is an in-memory database. In some example embodiments, if the database is a multi-tenant database, the database statement is sent to a specific container of the multi-tenant database associated with the user who sent the message. This association may be that the user is an authorized user of the tenant associated with the container.

At operation 408, an outbox processor integrated within the microservice application generates a database statement to write information about the action to an outbox data structure in the database. In a multi-tenant database embodiment, this database statement is written to an outbox data structure inside the container associated with the user. At operation 410, a change to the database is determined by the outbox processor. This determination may be based on two criteria: (1) the outbox processor has sent a database statement for processing; and (1) the database statement changes the state of the database in a way that the change leads to an emit. At operation 412, in response to the detecting, one or more entries in the outbox data structure are read out. At operation 414, one or more notifications are generated to an external system regarding the one or more entries read out of the outbox data structure. This reading out can occur while the outbox table is locked, such as by using a select-for update command. At operation 416, in response to determining that the one or more notifications were successful, the one or more entries are deleted from the outbox data structure.

In view of the disclosure above, various examples are set forth below. It should be noted that one or more features of an example, taken in isolation or combination, should be considered within the disclosure of this application.

Example 1. A system comprising:
at least one hardware processor; and
a computer-readable medium storing instructions that, when executed by the at least one hardware processor, cause the at least one hardware processor to perform operations comprising:
receiving, at a microservice application, a message involving an action to be performed on a database;
generating, at the microservice application, a database statement requesting the action be performed;
sending the database statement to a database for processing;
generating, at an outbox processor integrated within the microservice application, a database statement to write information about the action to an outbox data structure in the database;
in response to the generating of the database statement, reading out one or more entries in the outbox data structure; and
generating one or more notifications to an external system regarding the one or more entries read out of the outbox data structure.

Example 2. The system of Example 1, wherein the notifications to the external system are generated in chronological order by timestamp of each entry in the outbox data structure.

Example 3. The system of Examples 1 or 2, wherein the operations further comprise, in response to determining that the one or more notifications were successful, deleting the one or more entries from the outbox data structure.

Example 4. The system of any of Examples 1-3, wherein the one or more entries include all entries in the outbox data structure.

Example 5. The system of any of Examples 1-3, wherein the one or more entries include all entries in the outbox data structure that meet a first criterion.

Example 6. The system of any of Examples 1-5, wherein the database is a multi-tenant database with a separate container for each tenant, and
wherein each container contains a separate outbox data structure, and further
wherein the generating the database statement to write information about the action includes generating a database statement to write information about the action to an outbox data structure in a container corresponding to a user who generated the message.

Example 7. The system of any of Examples 1-6, wherein the reading out includes generating a database statement to read from the outbox data structure while locking the outbox data structure during the reading out.

Example 8. The system of Example 7, wherein the locking is accomplished using a select-for update statement.

Example 9. The system of Example 6, wherein the operations of claim 1 are performed by a first microservice application instance, wherein there are a plurality of microservice application instances of the same microservice application.

Example 10. The system of any of Examples 1-9, wherein communication to the external system is asynchronous.

Example 11. A method comprising:
receiving, at a microservice application, a message involving an action to be performed on a database;
generating, at the microservice application, a database statement requesting the action be performed;
sending the database statement to a database for processing;
generating, at an outbox processor integrated within the microservice application, a database statement to write information about the action to an outbox data structure in the database;
in response to the generating of the database statement, reading out one or more entries in the outbox data structure; and
generating one or more notifications to an external system regarding the one or more entries read out of the outbox data structure.

Example 12. The method of Example 11, further comprising, in response to determining that the one or more notifications were successful, deleting the one or more entries from the outbox data structure.

Example 13. The method of Examples 11 or 12, wherein the one or more entries include all entries in the outbox data structure.

Example 14. The method of Examples 11 or 12, wherein the one or more entries include all entries in the outbox data structure that meet a first criterion.

Example 15. The method of any of Examples 11-14, wherein the database is a multi-tenant database with a separate container for each tenant, and wherein each container contains a separate outbox data structure, and further wherein the generating the database statement to write information about the action includes generating a database statement to write information about the action to an outbox data structure in a container corresponding to a user who generated the message.

Example 16. The method of any of Examples 11-15, wherein the reading out includes generating a database statement to read from the outbox data structure while locking the outbox data structure during the reading out.

Example 17. The method of Example 16, wherein the locking is accomplished using a select-for update statement.

Example 18. The method of any of Examples 11-17, wherein the database is an in-memory database.

Example 19. The method of any of Examples 11-18, further comprising ordering the outbox data structure based on timestamps associated with each entry.

Example 20. A non-transitory machine-readable medium storing instructions which, when executed by one or more processors, cause the one or more processors to perform operations comprising:
receiving, at a microservice application, a message involving an action to be performed on a database;
generating, at the microservice application, a database statement requesting the action be performed;
sending the database statement to a database for processing;
generating, at an outbox processor integrated within the microservice application, a database statement to write information about the action to an outbox data structure in the database;
in response to the generating of the database statement, reading out one or more entries in the outbox data structure; and
generating one or more notifications to an external system regarding the one or more entries read out of the outbox data structure.

Figure 5:
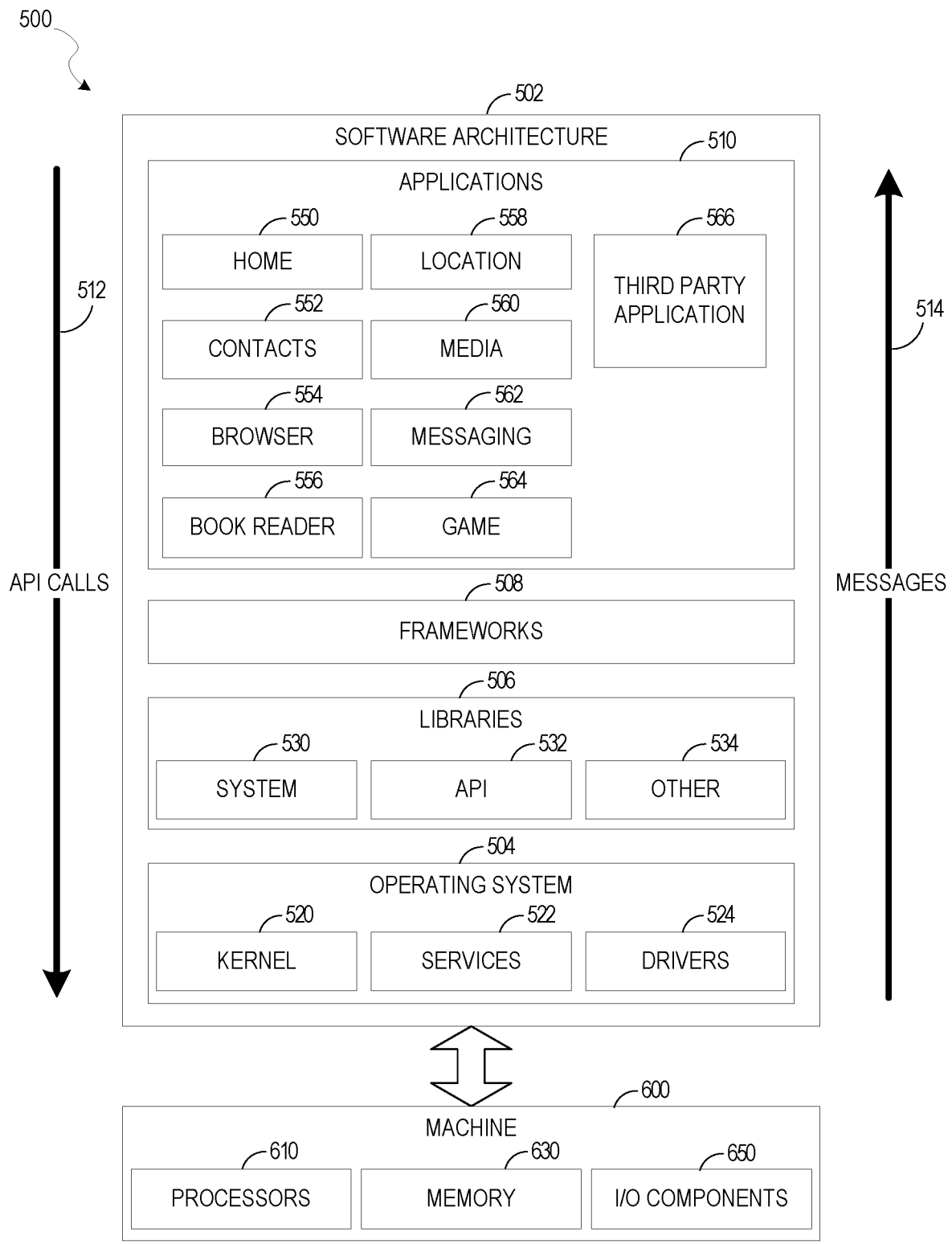
FIG. 5 is a block diagram illustrating an architecture of software, which can be installed on any one or more of the devices described above.

FIG. 5 is a block diagram 500 illustrating a software architecture 502, which can be installed on any one or more of the devices described above. FIG. 5 is merely a non-limiting example of a software architecture, and it will be appreciated that many other architectures can be implemented to facilitate the functionality described herein. In various embodiments, the software architecture 502 is implemented by hardware such as a machine 600 of FIG. 6 that includes processors 610, memory 630, and input/output (I/O) components 650. In this example architecture, the software architecture 502 can be conceptualized as a stack of layers where each layer may provide a particular functionality. For example, the software architecture 502 includes layers such as an operating system 504, libraries 506, frameworks 508, and applications 510. Operationally, the applications 510 invoke API calls 512 through the software stack and receive messages 514 in response to the API calls 512, consistent with some embodiments.

In various implementations, the operating system 504 manages hardware resources and provides common services. The operating system 504 includes, for example, a kernel 520, services 522, and drivers 524. The kernel 520 acts as an abstraction layer between the hardware and the other software layers, consistent with some embodiments. For example, the kernel 520 provides memory management, processor management (e.g., scheduling), component management, networking, and security settings, among other functionality. The services 522 can provide other common services for the other software layers. The drivers 524 are responsible for controlling or interfacing with the underlying hardware, according to some embodiments. For instance, the drivers 524 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 506 provide a low-level common infrastructure utilized by the applications 510. The libraries 506 can include system libraries 530 (e.g., C standard library) that can provide functions such as memory allocation functions, string manipulation functions, mathematic functions, and the like. In addition, the libraries 506 can include API libraries 532 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic context on a display), database libraries (e.g., SQLite to provide various relational database functions), web libraries (e.g., WebKit to provide web browsing functionality), and the like. The libraries 506 can also include a wide variety of other libraries 534 to provide many other APIs to the applications 510.

The frameworks 508 provide a high-level common infrastructure that can be utilized by the applications 510, according to some embodiments. For example, the frameworks 508 provide various graphical user interface (GUI) functions, high-level resource management, high-level location services, and so forth. The frameworks 508 can provide a broad spectrum of other APIs that can be utilized by the applications 510, some of which may be specific to a particular operating system 504 or platform.

In an example embodiment, the applications 510 include a home application 550, a contacts application 552, a browser application 554, a book reader application 556, a location application 558, a media application 560, a messaging application 562, a game application 564, and a broad assortment of other applications, such as a third-party application 566. According to some embodiments, the applications 510 are programs that execute functions defined in the programs. Various programming languages can be employed to create one or more of the applications 510, structured in a variety of manners, such as object-oriented programming languages (e.g., Objective-C, Java, or C++) or procedural programming languages (e.g., C or assembly language). In a specific example, the third-party application 566 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 566 can invoke the API calls 512 provided by the operating system 504 to facilitate functionality described herein.

Figure 6:
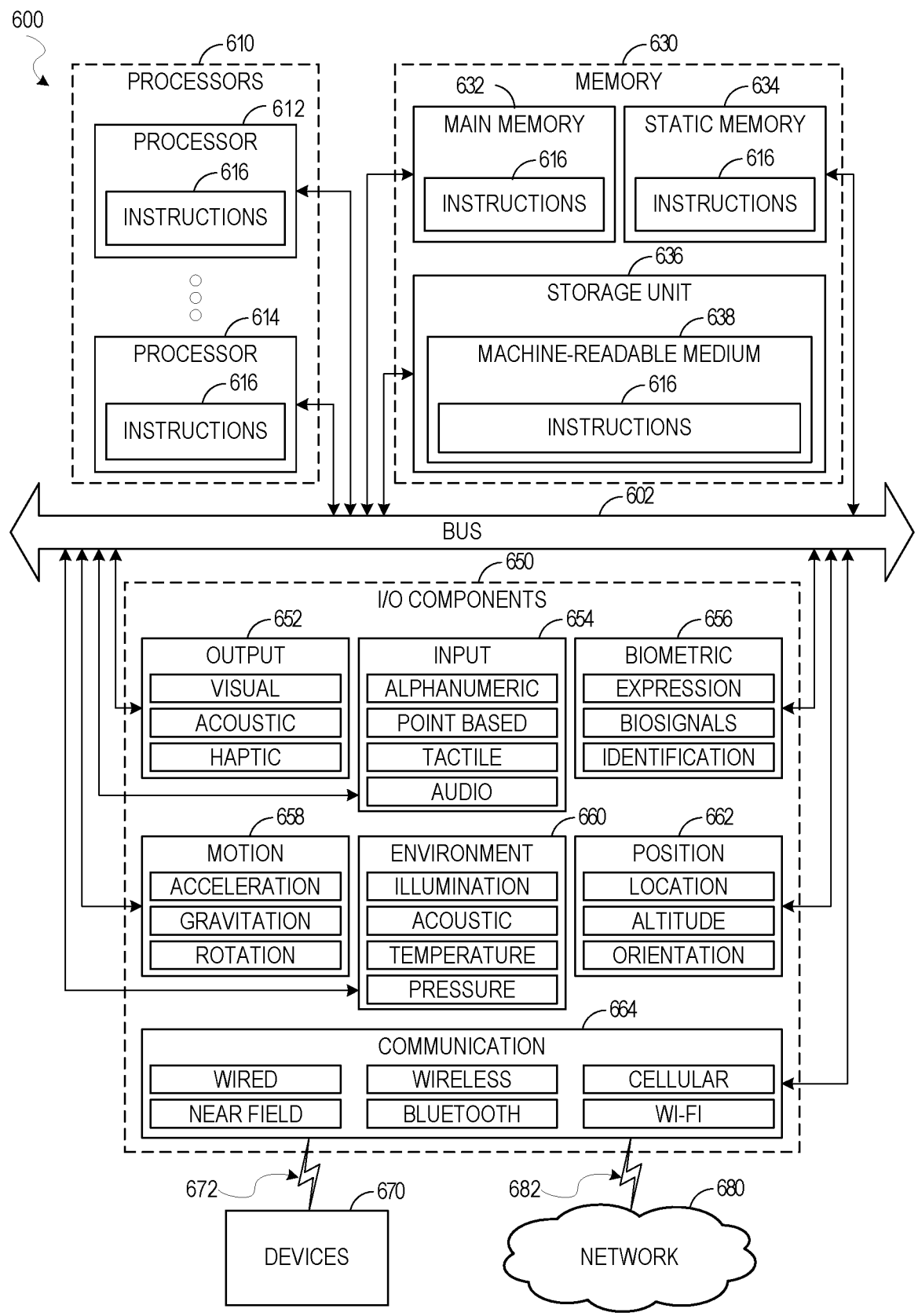
FIG. 6 illustrates a diagrammatic representation of a machine in the form of a computer system within which a set of instructions may be executed for causing the machine to perform any one or more of the methodologies discussed herein, according to an example embodiment.

FIG. 6 illustrates a diagrammatic representation of a machine 600 in the form of a computer system within which a set of instructions may be executed for causing the machine 600 to perform any one or more of the methodologies discussed herein, according to an example embodiment. Specifically, FIG. 6 shows a diagrammatic representation of the machine 600 in the example form of a computer system, within which instructions 616 (e.g., software, a program, an application, an applet, an app, or other executable code) for causing the machine 600 to perform any one or more of the methodologies discussed herein may be executed. For example, the instructions 616 may cause the machine 600 to execute the methods of FIG. 4. Additionally, or alternatively, the instructions 616 may implement FIGS. 1-4 and so forth. The instructions 616 transform the general, non-programmed machine 600 into a particular machine 600 programmed to carry out the described and illustrated functions in the manner described. In alternative embodiments, the machine 600 operates as a standalone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 616, sequentially or otherwise, that specify actions to be taken by the machine 600. Further, while only a single machine 600 is illustrated, the term "machine" shall also be taken to include a collection of machines 600 that individually or jointly execute the instructions 616 to perform any one or more of the methodologies discussed herein.

The machine 600 may include processors 610, memory 630, and I/O components 650, which may be configured to communicate with each other such as via a bus 602. In an example embodiment, the processors 610 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 612 and a processor 614 that may execute the instructions 616. The term "processor" is intended to include multi-core processors that may comprise two or more independent processors (sometimes referred to as "cores") that may execute instructions 616 contemporaneously. Although FIG. 6 shows multiple processors 610, the machine 600 may include a single processor 612 with a single core, a single processor 612 with multiple cores (e.g., a multi-core processor 612), multiple processors 612, 614 with a single core, multiple processors 612, 614 with multiple cores, or any combination thereof.

The memory 630 may include a main memory 632, a static memory 634, and a storage unit 636, each accessible to the processors 610 such as via the bus 602. The main memory 632, the static memory 634, and the storage unit 636 store the instructions 616 embodying any one or more of the methodologies or functions described herein. The instructions 616 may also reside, completely or partially, within the main memory 632, within the static memory 634, within the storage unit 636, within at least one of the processors 610 (e.g., within the processor's cache memory), or any suitable combination thereof, during execution thereof by the machine 600.

The I/O components 650 may include a wide variety of components to receive input, provide output, produce output, transmit information, exchange information, capture measurements, and so on. The specific I/O components 650 that are included in a particular machine will depend on the type of machine. For example, portable machines such as mobile phones will likely include a touch input device or other such input mechanisms, while a headless server machine will likely not include such a touch input device. It will be appreciated that the I/O components 650 may include many other components that are not shown in FIG. 6. The I/O components 650 are grouped according to functionality merely for simplifying the following discussion, and the grouping is in no way limiting. In various example embodiments, the I/O components 650 may include output components 652 and input components 654. The output components 652 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 654 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 650 may include biometric components 656, motion components 658, environmental components 660, or position components 662, among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 662 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 or devices 670 via a coupling 682 and a coupling 672, respectively. For example, the communication components 664 may include a network interface component or another suitable device to interface with the network 680. In further examples, the communication components 664 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 670 may be another machine or any of a wide variety of peripheral devices (e.g., coupled via a USB).

Moreover, the communication components 664 may detect identifiers or include components operable to detect identifiers. For example, the communication components 664 may include radio-frequency identification (RFID) tag reader components, NFC smart tag detection components, optical reader components (e.g., an optical sensor to detect one-dimensional bar codes such as Universal Product Code (UPC) bar code, multi-dimensional bar codes such as QR code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 664, such as location via Internet Protocol (IP) geolocation, location via Wi-Fi® signal triangulation, location via detecting an NFC beacon signal that may indicate a particular location, and so forth.

The various memories (i.e., 630, 632, 634, and/or memory of the processor(s) 610) and/or the storage unit 636 may store one or more sets of instructions 616 and data structures (e.g., software) embodying or utilized by any one or more of the methodologies or functions described herein. These instructions (e.g., the instructions 616), when executed by the processor(s) 610, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 680 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or another type of cellular or wireless coupling. In this example, the coupling 682 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 616 may be transmitted or received over the network 680 using a transmission medium via a network interface device (e.g., a network interface component included in the communication components 664) and utilizing any one of a number of well-known transfer protocols (e.g., Hypertext Transfer Protocol (HTTP)). Similarly, the instructions 616 may be transmitted or received using a transmission medium via the coupling 672 (e.g., a peer-to-peer coupling) to the devices 670. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 616 for execution by the machine 600, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   at least one hardware processor; and
   a computer-readable medium storing instructions that, when executed by the at least one hardware processor, cause the at least one hardware processor to perform operations comprising:
   receiving, at a microservice application, a message involving an action to be performed on a database;
   generating, at the microservice application, a first database statement requesting the action be performed;
   sending the first database statement to the database for processing;
   writing, at an outbox processor integrated within the microservice application, a first entry containing information about the action, to an outbox data structure in the database;
   in response to the sending of the first database statement, reading out a plurality of entries in the outbox data structure, the plurality of entries comprising the first entry and at least one other entry corresponding to a database statement sent to the database for processing prior to the first database statement; and
   generating one or more notifications to an external system regarding plurality of entries read out of the outbox data structure.

2. The system of claim 1, wherein the notifications to the external system are generated in chronological order by timestamp of each entry in the outbox data structure.

3. The system of claim 1, wherein the operations further comprise, in response to determining that the one or more notifications were successful, deleting the plurality of entries from the outbox data structure.

4. The system of claim 1, wherein the plurality of entries comprise all entries in the outbox data structure.

5. The system of claim 1, wherein the plurality of entries comprise all entries in the outbox data structure that meet a first criterion.

6. The system of claim 1, wherein the database is a multi-tenant database with a separate container for each tenant, and wherein each container contains a separate outbox data structure, and further wherein the writing comprises writing the first entry in a container corresponding to a user who generated the message.

7. The system of claim 1 comprising multiple outbox processors, wherein the reading out comprises generating a database statement to read from the outbox data structure while locking the outbox data structure during the reading out.

8. The system of claim 7, wherein the locking is accomplished using a select-for update statement.

9. The system of claim 6, wherein the operations are performed by a first microservice application instance, wherein there are a plurality of microservice application instances of a single microservice application and/or a plurality of micro service applications.

10. The system of claim 1, wherein communication to the external system is asynchronous.

11. A method comprising:
    receiving, at a microservice application, a message involving an action to be performed on a database;
    generating, at the microservice application, a first database statement requesting the action be performed;
    sending the first database statement to the database for processing;
    writing, at an outbox processor integrated within the microservice application, a first entry containing information about the action, to an outbox data structure in the database;
    in response to the sending of the first database statement, reading out a plurality of entries in the outbox data structure, the plurality of entries comprising the first entry and at least one other entry corresponding to a database statement sent to the database for processing prior to the first database statement; and
    generating one or more notifications to an external system regarding plurality of entries read out of the outbox data structure.

12. The method of claim 11, further comprising, in response to determining that the one or more notifications were successful, deleting the plurality of entries from the outbox data structure.

13. The method of claim 11, wherein the plurality of entries comprise all entries in the outbox data structure.

14. The method of claim 11, wherein the plurality of entries comprise all entries in the outbox data structure that meet a first criterion.

15. The method of claim 11, wherein the database is a multi-tenant database with a separate container for each tenant, and wherein each container contains a separate outbox data structure, and further wherein the writing comprises writing the first entry in a container corresponding to a user who generated the message.

16. The method of claim 11, wherein the reading out comprises generating a database statement to read from the outbox data structure while locking the outbox data structure during the reading out.

17. The method of claim 16, wherein the locking is accomplished using a select-for update statement.

18. The method of claim 11, wherein the database is an in-memory database.

19. The method of claim 11, further comprising ordering the outbox data structure based on timestamps associated with each entry.

20. A non-transitory machine-readable medium storing instructions which, when executed by one or more processors, cause the one or more processors to perform operations comprising:

receiving, at a microservice application, a message involving an action to be performed on a database;

generating, at the microservice application, a first database statement requesting the action be performed;

sending the first database statement to the database for processing;

writing, at an outbox processor integrated within the microservice application, a first entry containing information about the action, to an outbox data structure in the database;

in response to the sending of the first database statement, reading out a plurality of entries in the outbox data structure, the plurality of entries comprising the first entry and at least one other entry corresponding to a database statement sent to the database for processing prior to the first database statement; and generating one or more notifications to an external system regarding plurality of entries read out of the outbox data structure.

* * * * *